United States Patent Office 3,287,428
Patented Nov. 22, 1966

3,287,428
SEPARATION OF CYCLOHEXADIENE ISOMERS
David W. Peck, Charleston, W. Va., assignor to Union Carbide Corporation, a corporation of New York
No Drawing. Filed Apr. 10, 1964, Ser. No. 358,941
12 Claims. (Cl. 260—666)

This invention relates to a method for the separation of 1,3-cyclohexadiene and 1,4-cyclohexadiene from mixtures thereof. More particularly, this invention relates to a solvent-extraction method for separating cyclohexadiene isomers from their mixtures.

In the past it has been the practice to produce the cyclohexadiene isomers by different processes, each of which produced only one diene isomer. Thus, 1,3-cyclohexadiene was produced by halogenation of cyclohexene followed by dehydrohalogenation of the 1,2-dihalocyclohexane, and 1,4-cyclohexadiene was produced by the Birch reduction of benzene in the presence of sodium in liquid ammonia. It has now been discovered that both isomers are readily produced by the halogenation of cyclohexane followed by dehydrohalogenation of the halogenated cyclohexane. The resulting product, after distillation to separate hydrocarbons from unconverted halogenated cyclohexane, consists of a mixture of the two cyclohexadiene isomers as well as benzene and cyclohexene.

It has been discovered by this invention that one can, in one procedure, selectively recover a fraction enriched in the 1,3-isomer and a fraction enriched in the 1,4-isomer by extracting mixtures containing these isomers with aqueous solutions containing argentous ($Ag^+$) ion. The argentous solution dissolves cyclohexadiene in preference to benezne and cyclohexene and, in addition, dissolves 1,3-cyclohexandiene in preference to 1,4-cyclohexadiene.

Without wishing to be bound to any particular theories, it is believed that the extraction of this invention results because the argentous ion or compound preferentially complexes with cyclohexandiene in preference to benzene and cyclohexene and with 1,3-cyclohexadiene in preference to 1,4-cyclohexadiene. The resulting complex is water soluble and, thus, removes the cyclohexadiene from the organic phase. Thus, the process of this invention comprises essentially the step of contacting a mixture of both cyclohexadiene isomers with an aqueous solution of argentous ion and thereafter recovering an aqueous phase enriched in the 1,3-isomer and an organic phase enriched in the 1,4-isomer. The aqueous argentous solution is prepared from any desired water-soluble argentous compound, such as silver nitrate, silver fluoborate, silver fluoride silver fluogallate, silver fluosilicate and the like.

The particular conditions for effecting the extraction are not highly critical and can be varied in accordance with principles known to those having ordinary skill in the art. For example, the temperature should not be in excess of about 75° C. to avoid decompostiion of the silver-cyclohexadiene complex. Similarly, the concentration of silver ion in the aqueous solution and the ratio of silver ion to cyclohexadiene should be such that the silver and the cyclohexadiene are retained in aqueous solution. For example, it has been found that, when the combined amount of silver nitrate and cyclohexadiene is above about 40 weight percent of the solution, a precipitate forms, which is dissolved on the addition of water. In general, the complex is retained in solution when solutions containing from 0.03 to 0.06 gram atom of argentous ion per mole of water are contacted with the cyclohexadiene-containing fraction in a ratio of from about 0.1 to about 5 grams atoms of silver ion per mole of cyclohexadiene.

It is preferred to back-extract the aqueous extract with an organic solvent to remove dissolved impurities, such as benzene and cyclohexene, and remove the 1,4-isomer. Suitable solvents are saturated hydrocarbons, whether aliphatic or cycloaliphatic, of from about 4 to 10 carbons, such as butane, pentane, hexane, octane, decane, cyclopentane, cyclohexane, and the like. In this manner one obtains an aqueous phase further enriched in 1,3-cyclohexadiene and an organic phase enriched in 1,4-cyclohexadiene when compared with the original aqueous extract. The amount of organic solvent is not highly critical, and is readily determined by techniques known to the art.

The cyclohexadiene is readily recovered from the aqueous phase by distillation, leaving as a residue an aqueous argentous solution which can be recycled to the extraction as desired. Cyclohexadiene is recovered from the organic solvent wash by suitable techniques such as distillation, extraction, and the like.

The term "enriched," as employed herein, has reference to the relative amounts of isomers in the various fractions. Thus, the aqueous extract is enriched in the 1,3-isomer because it has a higher 1,3-isomer/1,4-isomer ratio than the feed; and the raffinate is enriched in 1,4-isomer because it has a lower 1,3-isomer/1,4-isomer ratio than the feed.

The following examples are illustrative.

*Example 1*

A 24-gram portion of 84.7 percent cyclohexadiene with the balance being benzene and cyclohexene, and having a 1,3-isomer to 1,4-isomer ratio of 2/1, was contacted in a separatory funnel with a solution of 51 grams of silver nitrate in 200 milliliters of water. The two phases were separated, and the organic raffinate, which weighed 9 grams, was found to contain 71.4 percent cyclohexadiene in a 1,3-/1,4-isomer ratio of 1.3/1. The aqueous phase was contacted with 50 milliliters of pentane. The pentane and aqueous phases were separated and the aqueous phase, after the addition of 200 grams of water, was distilled to recover 9 grams of 98.8 percent cyclohexadiene having a 1,3-isomer to 1,4-isomer ratio of 4.55/1. After distillation of pentane from the pentane phase there were recovered 5 grams of 89.8 percent of cyclohexadiene having a 1,3-/1,4-isomer ratio of 1.7/1.

*Example 2*

Employing apparatus and procedures similar to those described in Example 1, a 474-gram sample of 85.2 percent cyclohexadiene (1,3-/1,4-isomer ratio=1.68/1), the balance being benzene and cyclohexene, was extracted with a solution of 300 grams of silver nitrate in 566 grams of water. The aqueous extract was washed with three 25-milliliter portions of n-pentane, and the aqueous extract was distilled to recover cyclohexadiene. The aqueous silver nitrate solution remaining in the kettle was filtered to remove a small amount of silver oxide that had formed and then employed to extract the raffinate from the first extraction. The aqueous extract was washed with the pentane wash liquid from the first extraction and then with one 25-milliliter portion of fresh pentane, and the aqueous phase was distilled. This sequence was continued until a total of seven extractions had been conducted. Each of the seven extracts, the combined pentane washes and the final raffinate were analyzed by vapor phase chromatography, the results of which are set forth in tabular form below on a pentane-free base.

| Fraction | Weight, grams | Cyclohexadiene, wt. percent | 1,3-/1,4-isomer ratio |
| --- | --- | --- | --- |
| Feed | 474 | 85.2 | 1.68/1 |
| Extract No.: | | | |
| 1 | 58 | 99.4 | 3.69/1 |
| 2 | 51 | 99.3 | 3.6/1 |
| 3 | 54 | 99.1 | 2.85/1 |
| 4 | 48 | 99.3 | 2.53/1 |
| 5 | 40 | 98.4 | 1.79/1 |
| 6 | 42 | 98.3 | 1.59/1 |
| 7 | 29 | 96.4 | 0.92/1 |
| Pentane Wash | 32 | 65.0 | 0.38/1 |
| Raffinate | 46 | 27.5 | 0.22/1 |

*Example 3*

Employing apparatus and procedures similar to those described in Example 1, a 25-gram portion of 85.2 per cent cyclohexadiene having a 1,3-/1,4-isomer ratio of 1.68/1 was extracted with a solution of 100 grams of silver nitrate in 150 grams of water. The aqueous extract was washed with 10 milliliters of n-pentane and then mixed with 30 milliliters of water to dissolve the precipitate which had formed. The aqueous extract was washed with two additional 10-milliliter portions of n-pentane and then distilled to recover 15.5 grams of 98.7 percent cyclohexadiene in a 1,3-/1,4-isomer ratio of 2.15/1. On combination of the pentane extracts there were obtained 7 grams of 64.3 percent cyclohexadiene in a 1,3-/1,4-isomer ratio of 0.8/1.

What is claimed is:

1. The method for separating isomers of cyclohexadiene which comprises contacting a mixture containing said isomers at temperatures not in excess of 75° C. with an aqueous solution containing 0.03–0.06 gram atom argentous ion per mole of water at a ratio of from 0.1 to about 5 grams of argentous ion per mole of cyclohexadiene and thereafter recovering an aqueous phase enriched in 1,3-cyclohexadiene and an organic phase enriched in 1,4-cyclohexadiene.

2. The method for seperating isomers of cyclohexadiene which comprises contacting a mixture containing said isomers at temperatures not in exces of 75° C. with an aqueous solution containing 0.03–0.06 gram atom argentous ion per mole of water, at a ratio of from 0.1 to about 5 grams of argentous ion per mole of cyclohexadiene, separating the resulting aqueous and organic phases, and thereafter contacting said aqueous phase with a saturated hydrocarbon compound of from 4 to 10 carbon atoms and recovering an aqueous phase enriched in 1,3-cylclohexadiene and an organic phase enriched in 1,4-cyclohexadiene.

3. The method for separating isomers of cyclohexadiene which comprises contacing a mixture containing said isomers at a temperature not in excess of 75° C. with an aqueous solution of silver nitrate containing 0.03–0.06 gram atom of argentous ion per mole of water at a ratio of from 0.1 to about 5 grams of argentous ion per mole of cyclohexadiene and thereafter recovering an aqueous phase enriched in 1,3-cyclohexadiene and an organic phase enriched in 1,4-cyclohexadiene.

4. The method for separating isomers of cyclohexadiene which comprises contacting a mixture containing said isomers at a temperature not in excess of 75° C. with an aqueous solution of silver nitrate containing 0.03–0.06 gram atom of argentous ion per mole of water at a ratio of from 0.1 to about 5 grams of argentous ion per mole of cyclohexadiene, separating the resulting aqueous and organic phases, and thereafter contacting said aqueous phase with a saturated hydrocarbon compound of from 4 to 10 carbon atoms and recovering an aqueous phase enriched in 1,3-cyclohexadiene and an organic phase enriched in 1,4-cyclohexadiene.

5. The method for separating isomers of cyclohexadiene which comprises contacting a mixture containing said isomers at temperatures not in excess of 75° C. with an aqueous solution containing 0.03–0.06 gram atom argentous ion per mole of water at a ratio of from 0.1 to about 5 grams of argentous ion per mole of cyclohexadiene, separating the resulting aqueous and organic phases, and thereafter contacting said aqueous phase with pentane and recovering an aqueous phase enriched in 1,3-cyclohexadiene and an organic phase enriched in 1,4-cyclohexadiene.

6. The method for separating isomers of cyclohexadiene which comprises contacting a mixture containing said isomers at a temperature not in exces of 75° C. with an aqueous solution of silver nitrate containing 0.03–0.06 gram atom argentous ion per mole of water at a ratio of from 0.1 to about 5 grams of argentous ion per mole of cyclohexadiene, separating the resulting aqueous and organic phases, and thereafter contacting said aqueous phase with pentane and recovering aqueous phase enriched in 1,3-cyclohexadiene and an organic phase enriched in 1,4-cyclohexadiene.

7. The method for separating isomers of cyclohexadiene which comprises contacting a mixture containing said isomers at temperatures not in excess of 75° C. in admixture with at least one member of the group consisting of benzene and cyclohexene with an aqueous solution containing 0.03–0.06 gram atom argentous ion per mole of water, at a ratio of from 0.1 to about 5 grams of argentous ion per mole of cyclohexadiene and thereafter recovering an aqueous phase enriched in 1,3-cyclohexadiene and an organic phase enriched in 1,4-cyclohexadiene.

8. The method for separating isomers of cyclohexadiene which comprises contacting a mixture containing said isomers at temperatures not in excess of 75° C. in admixture with at least one member of the group consisting of benzene and cyclohexene with an aqueous solution containing 0.03–0.06 gram atom argentous ion per mole of water, at a ratio of from 0.1 to about 5 grams of argentous ion per mole of cyclohexadiene, separating the resulting aqueous and organic phases, and thereafer contacting said aqueous phase with a saturated hydrocarbon compound of from 4 to 10 carbon atoms and recovering an aqueous phase enriched in 1,3-cyclohexadiene and an organic phase enriched in 1,4-cyclohexadiene.

9. The method for separating isomers of cyclohexadiene which comprises contacting a mixture containing said isomers at temperatures not in excess of 75° C. in admixture with at least one member of the group consisting of benzene and cyclohexene with an aqueous solution of silver nitrate containing 0.03–0.06 gram atom argentous ion per mole of water, at a ratio of from 0.1 to about 5 grams of argentous ion per mole of cyclohexadiene and thereafter recovering an aqueous phase enriched in 1,3-cyclohexadiene and an organic phase enriched in 1,4-cyclohexadiene.

10. The method for separating isomers of cyclohexadiene which comprises contacting a mixture containing said isomers at temperatures not in excess of 75° C. in admixture with at least one member of the group consisting of benzene and cyclohexene with an aqueous solution of silver nitrate containing 0.03–0.06 gram atom argentous ion per mole of water, at a ratio of from 0.1 to about 5 grams of argentous ion per mole of cyclohexadiene, separating the resulting aqueous and organic phases, and thereafter contacting said aqueous phase with a saturated hydrocarbon compound of from 4 to 10 carbon atoms and recovering an aqueous phase enriched in 1,3-cyclohexadiene and an organic phase enriched in 1,4-cyclohexadiene.

11. The method for separating isomers of cyclohexadiene which comprises contacting a mixture containing said isomers at temperatures not in excess of 75° C. in admixture with at least one member of the group consisting of benzene and cyclohexene with an aqueous solution containing 0.03–0.06 gram atom argentous ion per mole of water, at a ratio of from 0.1 to about 5 grams of argentous ion per mole of cyclohexadiene, separating the resulting aqueous and organic phases, and thereafter contacting said aqueous phase with pentane and recovering an aqueous phase enriched in 1,3-cyclohexadiene and an organic phase enriched in 1,4-cyclohexadiene.

12. The method for separating isomers of cyclohexadiene which comprises contacting a mixture containing said isomers at temperatures not in excess of 75° C. in admixture with at least one member of the group consisting of benzene and cyclohexene with an aqueous solution of silver nitrate containing 0.03–0.06 gram atom argentous ion per mole of water, at a ratio of from 0.1 to about 5 grams of argentous ion per mole of cyclohexadiene, separating the resulting aqueous and organic phases, and thereafter contacting said aqueous phase with pentane and recovering an aqueous phase enriched in 1,3-cyclohexadiene and an organic phase enriched in 1,4-cyclohexadiene.

References Cited by the Examiner

UNITED STATES PATENTS

| | | | |
|---|---|---|---|
| 1,980,649 | 11/1934 | Voorhees | 208—337 |
| 2,119,871 | 6/1938 | Whiteley | 208—337 |
| 2,166,160 | 7/1939 | King | 208—337 |
| 2,858,902 | 11/1958 | Cottle | 260—666 |

OTHER REFERENCES

M. A. Muhs et al.: J. Amer. Chem. Soc., 84 pp. 4697–4705, Dec. 20, 1962.

References Cited by the Applicant

De Kock et al.: Chem. Abs., 55, 3412a (1960).

Traynham et al.: J. Am. Chem. Soc., 78, 4024 (Aug. 20, 1956).

DELBERT E. GANTZ, *Primary Examiner.*

V. O'KEEFE, *Assistant Examiner.*